US012577757B2

(12) United States Patent
Ogawa et al.

(10) Patent No.: US 12,577,757 B2
(45) Date of Patent: Mar. 17, 2026

(54) CONSTRUCTION MACHINE, CONSTRUCTION MACHINE MANAGEMENT SYSTEM, AND MACHINE LEARNING APPARATUS

(71) Applicant: SUMITOMO HEAVY INDUSTRIES, LTD., Tokyo (JP)

(72) Inventors: Masaki Ogawa, Kanagawa (JP); Ayano Shinato, Kanagawa (JP)

(73) Assignee: SUMITOMO HEAVY INDUSTRIES, LTD., Tokyo (JP)

(*) Notice: Subject to any disclaimer, the term of this patent is extended or adjusted under 35 U.S.C. 154(b) by 156 days.

(21) Appl. No.: 17/933,515

(22) Filed: Sep. 20, 2022

(65) Prior Publication Data

US 2023/0008338 A1    Jan. 12, 2023

Related U.S. Application Data

(63) Continuation of application No. PCT/JP2021/011446, filed on Mar. 19, 2021.

(30) Foreign Application Priority Data

Mar. 25, 2020    (JP) ................................. 2020-054726

(51) Int. Cl.
*E02F 9/24*        (2006.01)
*E02F 9/22*        (2006.01)
*E02F 9/26*        (2006.01)
*G06N 20/00*      (2019.01)

(52) U.S. Cl.
CPC .................. *E02F 9/24* (2013.01); *E02F 9/26* (2013.01); *G06N 20/00* (2019.01); *E02F*

*9/2228* (2013.01); *E02F 9/2285* (2013.01); *E02F 9/2292* (2013.01); *E02F 9/2296* (2013.01)

(58) Field of Classification Search
CPC ... E02F 9/24; E02F 9/26; E02F 9/2228; E02F 9/2285; E02F 9/2292; E02F 9/2296; G06N 20/00
See application file for complete search history.

(56) References Cited

U.S. PATENT DOCUMENTS

| | | |
|---|---|---|
| 2016/0005286 A1 | 1/2016 | Kiyota |
| 2016/0247332 A1 | 8/2016 | Egawa |
| 2016/0292933 A1 | 10/2016 | Sprock et al. |

(Continued)

FOREIGN PATENT DOCUMENTS

| | | |
|---|---|---|
| EP | 2511677 | 10/2012 |
| EP | 3951089 | 2/2022 |

(Continued)

OTHER PUBLICATIONS

International Search Report for PCT/JP2021/011446 mailed on Jun. 8, 2021.

*Primary Examiner* — Michael D Lang
(74) *Attorney, Agent, or Firm* — IPUSA, PLLC

(57) ABSTRACT

A construction machine includes a travel actuator, an attachment actuator, a storage, an information obtaining device, and a hardware processor configured to perform braking control of at least one of the travel actuator and the attachment actuator in response to determining that a dangerous situation is going to occur based on information obtained by the information obtaining device and information stored in a database in the storage.

14 Claims, 10 Drawing Sheets

(56)                    References Cited

U.S. PATENT DOCUMENTS

| | | |
|---|---|---|
| 2019/0093321 A1 | 3/2019 | Hiekata |
| 2019/0310091 A1* | 10/2019 | Maeda ................... G01C 21/30 |
| 2020/0074383 A1* | 3/2020 | Smith ....................... F16P 3/14 |
| 2022/0018096 A1 | 1/2022 | Nishi |

FOREIGN PATENT DOCUMENTS

| | | |
|---|---|---|
| JP | S62-001052 | 1/1987 |
| JP | 2001-229384 | 8/2001 |
| JP | 2011-220104 | 11/2011 |
| JP | 2014-183500 | 9/2014 |
| JP | 2016-156193 | 9/2016 |
| JP | 2017-157016 | 9/2017 |
| KR | 10-2065975 | 1/2020 |
| WO | 2020/046598 | 3/2020 |
| WO | 2020/204007 | 10/2020 |

* cited by examiner

CONSTRUCTION MACHINE, CONSTRUCTION MACHINE MANAGEMENT SYSTEM, AND MACHINE LEARNING APPARATUS

CROSS-REFERENCE TO RELATED APPLICATIONS

This application is a continuation application filed under 35 U.S.C. 111(a) claiming benefit under 35 U.S.C. 120 and 365(c) of PCT International Application No. PCT/JP2021/011446, filed on Mar. 19, 2021 and designating the U.S., which claims priority to Japanese Patent Application No. 2020-054726, filed on Mar. 25, 2020. The entire contents of the foregoing applications are incorporated herein by reference.

BACKGROUND

Technical Field

The present disclosure relates to construction machines, construction machine management systems, and machine learning apparatuses.

Description of Related Art

A shovel configured to be able to detect a person present in a surrounding area based on an image captured by a camera attached to an upper swing structure has been known.

SUMMARY

According to an aspect of the present invention, a construction machine includes a travel actuator, an attachment actuator, a storage, an information obtaining device, and a hardware processor configured to perform braking control of at least one of the travel actuator and the attachment actuator in response to determining that a dangerous situation is going to occur based on information obtained by the information obtaining device and information stored in a database in the storage.

DETAILED DESCRIPTION

The related-art shovel, while being able to detect a person that has entered a predetermined area set around the shovel, cannot prevent dangerous situations from occurring.

Therefore, it is desirable to provide a construction machine that can prevent dangerous situations from occurring.

According to an embodiment, a construction machine that can prevent dangerous situations from occurring is provided.

Figure 1:
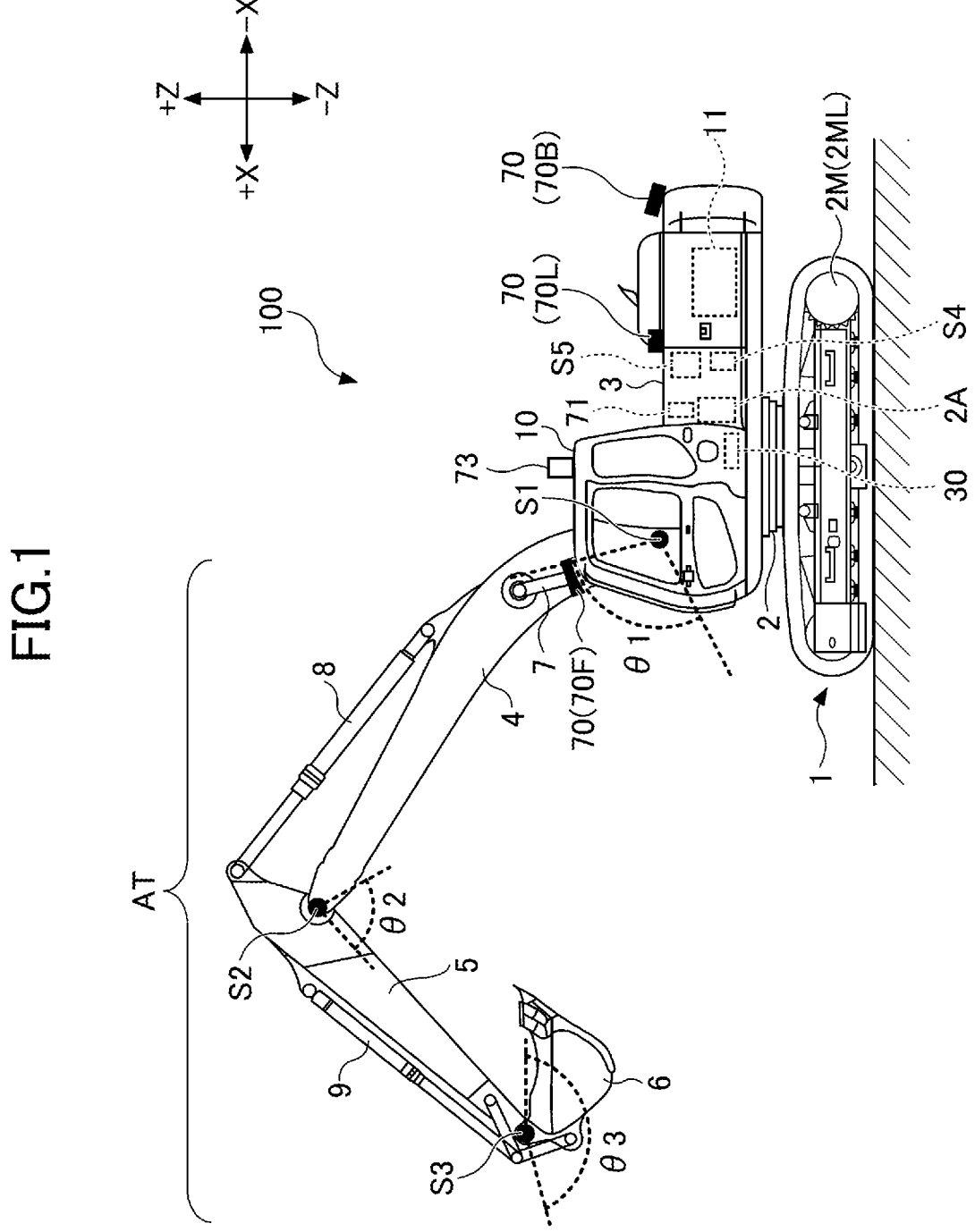
FIG. 1 is a side view of a shovel according to an embodiment.
Figure 2:
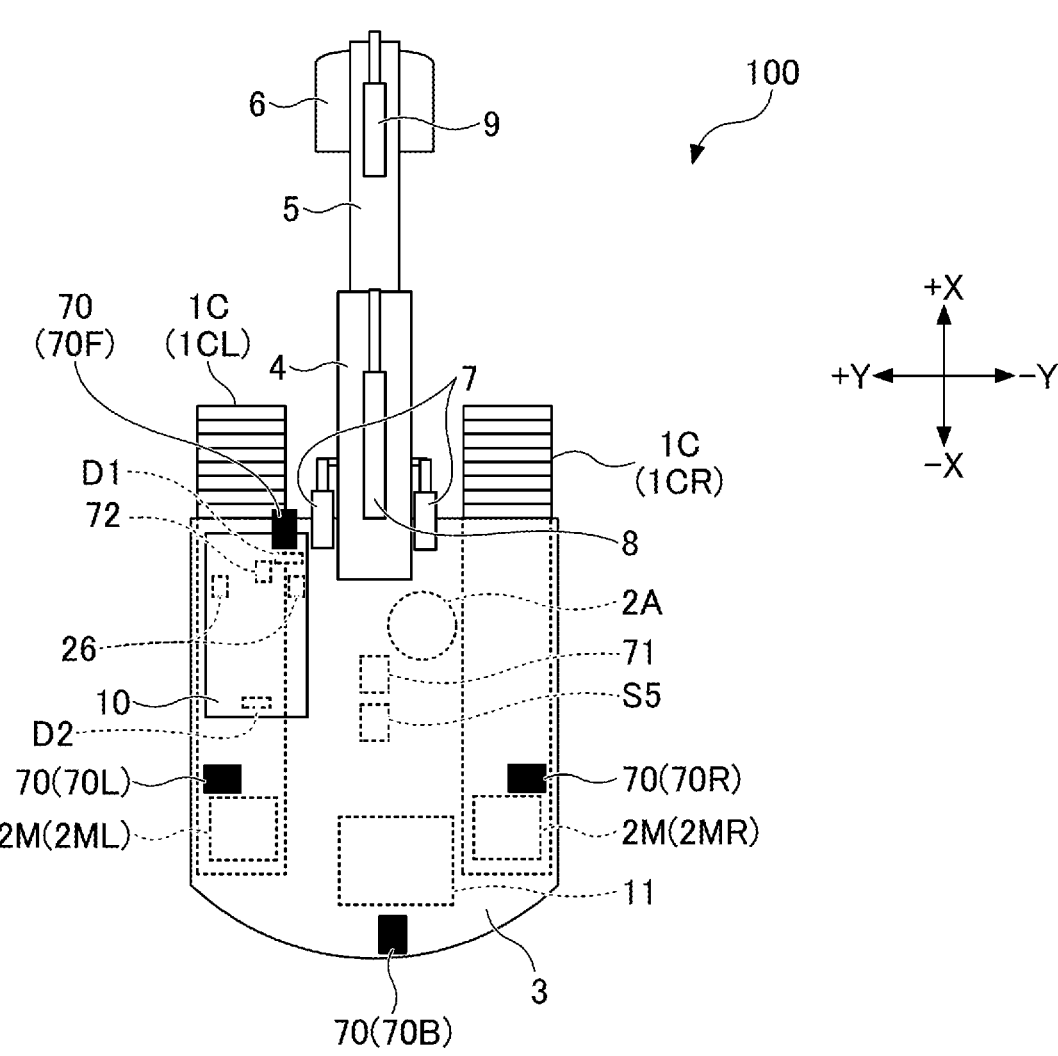
FIG. 2 is a top plan view of the shovel of FIG. 1.
Figure 3:
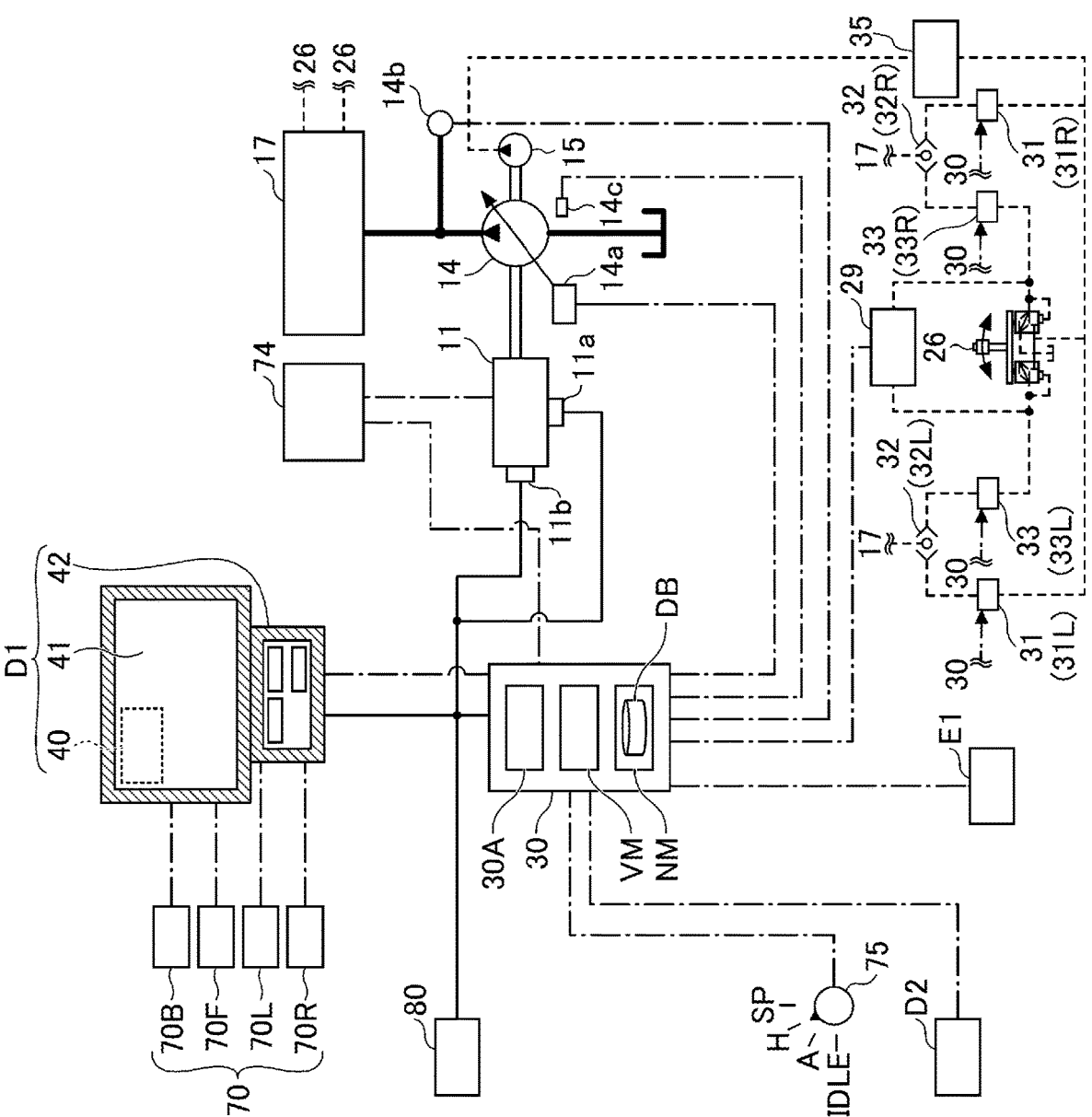
FIG. 3 is a diagram illustrating an example configuration of a basic system installed in the shovel of FIG. 1.

First, a shovel 100 serving as an excavator (an example of a construction machine) according to an embodiment of the present invention is described with reference to FIGS. 1 through 3. FIG. 1 is a side view of the shovel 100. FIG. 2 is a top plan view of the shovel 100. FIG. 3 illustrates an example configuration of a basic system installed in the shovel 100 of FIG. 1.

According to this embodiment, a lower traveling structure 1 of the shovel 100 includes a crawler 10. The crawler 1C is driven by a travel hydraulic motor 2M serving as a travel actuator installed in the lower traveling structure 1. Specifically, as illustrated in FIG. 2, the crawler 1C includes a left crawler 1CL and a right crawler 1CR, and the travel hydraulic motor 2M includes a left travel hydraulic motor 2ML and a right travel hydraulic motor 2MR. The left crawler 1CL is driven by the left travel hydraulic motor 2ML. The right crawler 1CR is driven by the right travel hydraulic motor 2MR.

An upper swing structure 3 is swingably mounted on the lower traveling structure 1 via a swing mechanism 2. The swing mechanism 2 is driven by a swing hydraulic motor 2A serving as a swing actuator mounted on the upper swing structure 3. The swing actuator may alternatively be a swing motor generator serving as an electric actuator.

A boom 4 is attached to the upper swing structure 3. An arm 5 is attached to the distal end of the boom 4. A bucket 6 serving as an end attachment is attached to the distal end of the arm 5. The boom 4, the arm 5, and the bucket 6 constitute an excavation attachment AT that is an example of an attachment. The attachment is driven by an attachment actuator. For example, the boom 4 is driven by a boom cylinder 7, the arm 5 is driven by an arm cylinder 8, and the bucket 6 is driven by a bucket cylinder 9.

The boom 4 is supported in such a manner as to be able to pivot up and down relative to the upper swing structure 3. A boom angle sensor S1 is attached to the boom 4. The boom angle sensor S1 can detect a boom angle 61 that is the pivot angle of the boom 4. The boom angle 61 is, for example, a rise angle from the lowest position of the boom 4. Therefore, the boom angle 61 is maximized when the boom 4 is most raised.

The arm 5 is supported in such a manner as to be able to pivot relative to the boom 4. An arm angle sensor S2 is attached to the arm 5. The arm angle sensor S2 can detect an arm angle $\theta 2$ that is the pivot angle of the arm 5. The arm angle $\theta 2$ is, for example, an opening angle from the most closed position of the arm 5. Therefore, the arm angle $\theta 2$ is maximized when the arm 5 is most opened.

The bucket 6 is supported in such a manner as to be able to pivot relative to the arm 5. A bucket angle sensor S3 is attached to the bucket 6. The bucket angle sensor S3 can detect a bucket angle $\theta 3$ that is the pivot angle of the bucket 6. The bucket angle $\theta 3$ is an opening angle from the most closed position of the bucket 6. Therefore, the bucket angle θ3 is maximized when the bucket 6 is most opened.

Each of the boom angle sensor S1, the arm angle sensor S2, and the bucket angle sensor S3, which is constituted of a combination of an acceleration sensor and a gyroscope according to the embodiment of FIG. 1, may also be constituted of an acceleration sensor alone. Furthermore, the boom angle sensor S1 may also be a stroke sensor attached to the boom cylinder 7, a rotary encoder, a potentiometer, an inertial measurement unit, or the like. The same applies to the arm angle sensor S2 and the bucket angle sensor S3.

A cabin 10 serving as a cab is provided and a power source such as an engine 11 is mounted on the upper swing structure 3. Furthermore, a space recognition device 70, an orientation detector 71, a positioning device 73, a machine body tilt sensor S4, a swing angular velocity sensor S5, etc., are attached to the upper swing structure 3. An operating device 26, an operating pressure sensor 29, a controller 30, an information input device 72, a display device D1, a sound output device D2, etc., are provided in the cabin 10. In this specification, for convenience, the side on which the excavation attachment AT is attached (the positive X side) of the upper swing structure 3 is defined as the front side and the side on which a counterweight is attached (the negative X side) of the upper swing structure 3 is defined as the back side.

The operating device 26 is a device that an operator uses to operate an actuator. The operating device 26 includes, for example, an operating lever and an operating pedal. The actuator includes at least one of a hydraulic actuator and an electric actuator. According to this embodiment, the operating device 26 is configured to be able to supply hydraulic oil discharged by a pilot pump 15 to a pilot port of a corresponding control valve in a control valve 17 via a pilot line as illustrated in FIG. 3. The pressure of hydraulic oil supplied to each pilot port (pilot pressure) is a pressure commensurate with the direction of operation and the amount of operation of the operating device 26 corresponding to each hydraulic actuator. The operating device 26, however, may alternatively be an electrical control type instead of being such a pilot pressure type. In this case, control valves in the control valve 17 may be electromagnetic solenoid spool valves.

Specifically, the operating device 26 includes a left operating lever and a right operating lever as illustrated in FIG. 2. The left operating lever is used to perform a swing motion and operate the arm 5. The right operating lever is used to operate the boom 4 and operate the bucket 6.

The operating pressure sensor 29 is configured to be able to detect the details of the operator's operation on the operating device 26. According to this embodiment, the operating pressure sensor 29 detects the direction of operation and the amount of operation of the operating device 26 corresponding to each actuator in the form of pressure, and outputs a detected value to the controller 30. The operation details of the operating device 26 may be detected using a sensor other than an operating pressure sensor.

Specifically, the operating pressure sensor 29 includes a left operating pressure sensor and a right operating pressure sensor. The left operating pressure sensor detects the details of each of the operator's forward or backward operation on the left operating lever and the operator's leftward or rightward operation on the left operating lever in the form of pressure, and outputs a detected value to the controller 30. Examples of operation details include the direction of lever operation and the amount of lever operation (the angle of lever operation). The same applies to the right operating lever.

The space recognition device 70 is configured to obtain information on a three-dimensional space around the shovel 100. Furthermore, the space recognition device 70 may also be configured to calculate a distance from the space recognition device 70 or the shovel 100 to an object recognized by the space recognition device 70. Examples of the space recognition device 70 include an ultrasonic sensor, a millimeter wave radar, a monocular camera, a stereo camera, a LIDAR, a distance image sensor, and an infrared sensor. According to this embodiment, the space recognition device 70 includes a front camera 70F attached to the front end of the upper surface of the cabin 10, a back camera 70B attached to the back end of the upper surface of the upper swing structure 3, a left camera 70L attached to the left end of the upper surface of the upper swing structure 3, and a right camera 70R attached to the right end of the upper surface of the upper swing structure 3. The front camera 70F is optional.

The space recognition device 70 is, for example, a monocular camera including an imager such as a CCD or CMOS, and outputs a captured image to the display device D1. When a LIDAR, a millimeter wave radar, an ultrasonic sensor, a laser radar or the like is employed as the space recognition device 70, the space recognition device 70 may not only use a captured image but also emit multiple signals (such as laser beams) to an object and receive their reflected signals to detect the distance and direction of the object from the reflected signals.

The space recognition device 70 may also be configured to detect an object present in an area surrounding the shovel 100. Examples of objects include a terrain shape (a gradient, a hole or the like), an electrical wire, a utility pole, a person, an animal, a vehicle, a construction machine, a building, a wall, a helmet, a safety vest, workwear, and a predetermined mark on a helmet. The space recognition device 70 may be configured to identify at least one of the type, position, shape, etc., of an object. The space recognition device 70 may be configured to distinguish between a person and an object other than a person.

Furthermore, the space recognition device 70 may be independent of the shovel 100. Furthermore, the controller 30 may obtain a captured image of a worksite around the shovel 100 output by the space recognition device 70 via a communications device. Specifically, the space recognition device 70 may be attached to a multicopter for aerial photography or a steel tower, a utility pole or the like installed in a worksite to obtain information on the worksite based on a captured image of the worksite as seen from above.

The orientation detector 71 is configured to detect information on the relative relationship between the orientation of the upper swing structure 3 and the orientation of the lower traveling structure 1. The orientation detector 71 may be constituted of, for example, a combination of a geomagnetic sensor attached to the lower traveling structure 1 and a geomagnetic sensor attached to the upper swing structure 3. Alternatively, the orientation detector 71 may be constituted of a combination of a GNSS receiver attached to the lower traveling structure 1 and a GNSS receiver attached to the upper swing structure 3. The orientation detector 71 may also be a rotary encoder, a rotary position sensor, or the like. In a configuration where the upper swing structure 3 is driven to swing by a swing motor generator, the orientation detector 71 may be constituted of a resolver. The orientation detector 71 may be constituted of a resolver. The orientation detector 71 may be attached to, for example, a center joint provided in association with the swing mechanism 2, which achieves relative rotation between the lower traveling structure 1 and the upper swing structure 3.

The orientation detector 71 may also be constituted of a camera attached to the upper swing structure 3. In this case, the orientation detector 71 performs known image processing on an image captured by the camera attached to the upper swing structure 3 (an input image) to detect an image of the lower traveling structure 1 included in the input image. The orientation detector 71 identifies the longitudinal direction of the lower traveling structure 1 by detecting the image of the lower traveling structure 1 using a known image recognition technique. Furthermore, the orientation detector 71 derives an angle formed between the direction of the longitudinal axis of the upper swing structure 3 and the longitudinal direction of the lower traveling structure 1. The direction of the longitudinal axis of the upper swing structure 3 is derived from the input image. This is because the relationship between the direction of the optical axis of the camera and the direction of the longitudinal axis of the upper swing structure 3 is known. Because the crawler 1C protrudes from the upper swing structure 3, the orientation detector 71 can identify the longitudinal direction of the lower traveling structure 1 by detecting an image of the crawler 10. The orientation detector 71 may be integrated with the controller 30.

The information input device 72 is configured to enable the operator of the shovel 100 to input information to the controller 30. According to this embodiment, the information input device 72 is a switch panel installed near an image display part 41 of the display device D1. The information input device 72, however, may also be a touchscreen placed over the image display part 41 of the display device D1, a dial or a directional pad provided at the top of an operating lever, or a sound input device such as a microphone placed in the cabin 10. Furthermore, the information input device 72 may also be a communications device. In this case, the operator can input information to the controller 30 via a communications terminal such as a smartphone.

The positioning device 73 is configured to measure a current position. According to this embodiment, the positioning device 73 is a GNSS receiver, and detects the position of the upper swing structure 3 to output a detection value to the controller 30. The positioning device 73 may also be a GNSS compass. In this case, the positioning device 73 can detect the position and the orientation of the upper swing structure 3.

The machine body tilt sensor S4 detects the tilt of the upper swing structure 3 with respect to a predetermined plane. According to this embodiment, the machine body tilt sensor S4 is an acceleration sensor that detects the tilt angle (roll angle) of the upper swing structure 3 about its longitudinal axis and the tilt angle (pitch) of the upper swing structure 3 about its lateral axis relative to a horizontal plane. The longitudinal axis and the lateral axis of the upper swing structure 3, for example, pass through a shovel central point that is a point on the swing axis of the shovel 100, crossing each other at right angles.

The swing angular velocity sensor S5 detects the swing angular velocity of the upper swing structure 3. According to this embodiment, the swing angular velocity sensor S5 is a gyroscope. The swing angular velocity sensor S5 may also be a resolver, a rotary encoder or the like. The swing angular velocity sensor S5 may also detect swing speed. The swing speed may be calculated from the swing angular velocity.

In the following, at least one of the boom angle sensor S1, the arm angle sensor S2, the bucket angle sensor S3, the machine body tilt sensor S4, and the swing angular velocity sensor S5 is also referred to as a pose detector. The pose of the excavation attachment AT is detected based on, for example, the respective outputs of the boom angle sensor S1, the arm angle sensor S2, and the bucket angle sensor S3. Sensors such as a pose detector, the positioning device 73, the machine body tilt sensor S4, the swing angular velocity sensor S5, the orientation detector 71, the operating pressure sensor 29, and a discharge pressure sensor 14*b* are included in a state quantity obtaining part.

The display device D1 is an example of a notification device and is configured to be able to display various kinds of information. According to this embodiment, the display device D1 is a liquid crystal display installed in the cabin 10. The display device D1 may also be the display of a communications terminal such as a smartphone.

The sound output device D2 is another example of the notification device and is configured to be able to output a sound. The sound output device D2 includes at least one of a device that outputs a sound to the operator in the cabin 10 and a device that outputs a sound to a worker outside the cabin 10. The sound output device D2 may be a loudspeaker attached to a communications terminal.

The controller 30 is a control device for controlling the shovel 100. According to this embodiment, the controller 30 is constituted of a computer including a CPU, a volatile storage VM (see FIG. 3), and a nonvolatile storage NM (see FIG. 3). The controller 30 reads programs corresponding to functions from the nonvolatile storage NM, loads the read programs into the volatile storage VM, and causes the CPU to execute corresponding processes. The functions include, for example, a machine guidance function to guide the operator in manually operating the shovel 100 and a machine control function to assist the operator in manually operating the shovel 100 or cause the shovel 100 to automatically or autonomously operate.

Next, a basic system installed in the shovel 100 of FIG. 1 is described with reference to FIG. 3. In FIG. 3, a mechanical power transmission line, a hydraulic oil line, a pilot line, a power line, and an electrical control line are indicated by a double line, a thick solid line, a dashed line, a thin solid line, and a one-dot chain line, respectively.

The basic system mainly includes the engine 11, a main pump 14, the pilot pump 15, the control valve 17, the operating device 26, the operating pressure sensor 29, the controller 30, a proportional valve 31, a shuttle valve 32, a proportional valve 33, a selector valve 35, an engine control unit 74, an engine rotational speed adjustment dial 75, a rechargeable battery 80, the display device D1, the sound output device D2, and an information obtaining device E1.

The engine 11 is a diesel engine that adopts isochronous control to keep the engine rotational speed constant irrespective of an increase or decrease in a load. The amount of fuel injection, the timing of fuel injection, a boost pressure, etc., in the engine 11 are controlled by the engine control unit 74.

The rotating shaft of the engine 11 is connected to the rotating shaft of each of the main pump 14 and the pilot pump 15 that serve as hydraulic pumps. The main pump 14 is connected to the control valve 17 via a hydraulic oil line. The pilot pump 15 is connected to the operating device 26 via a pilot line. The pilot pump 15, however, may be omitted. In this case, the function carried by the pilot pump 15 may be implemented by the main pump 14. That is, the main pump 14 may have the function of supplying hydraulic oil to the operating device 26, etc., after reducing the pressure of the hydraulic oil with a throttle or the like, apart from the function of supplying hydraulic oil to the control valve 17.

The control valve 17 is a hydraulic controller that controls the hydraulic system of the shovel 100. The control valve 17 is connected to hydraulic actuators such as the left travel hydraulic motor 2ML, the right travel hydraulic motor 2MR, the boom cylinder 7, the arm cylinder 8, the bucket cylinder 9, and the swing hydraulic motor 2A.

Specifically, the control valve 17 includes multiple spool valves corresponding to the hydraulic actuators. Each spool valve is configured to be able to change its position according to a pilot pressure so as to be able to increase and decrease the opening area of a PC port and the opening area of a CT port. The PC port is a port that constitutes part of an oil passage connecting the main pump 14 and a hydraulic actuator. The CT port is a port that constitutes part of an oil passage connecting a hydraulic actuator and a hydraulic oil tank.

The proportional valve 31 includes proportional valves 31L and 31R and operates as a control valve for machine control. The proportional valve 31 is placed in a conduit connecting the pilot pump 15 and the shuttle valve 32, and is configured to be able to change the flow area of the conduit. According to this embodiment, the proportional valve 31 operates in response to a control command output by the controller 30. Therefore, the controller 30 can supply hydraulic oil discharged by the pilot pump 15 to a pilot port of a corresponding control valve in the control valve 17 through the proportional valve 31 and the shuttle valve 32, independent of the operator's operation on the operating device 26.

The shuttle valve 32 includes shuttle valves 32L and 32R, and has two inlet ports and one outlet port. Of the two inlet ports, one is connected to the operating device 26 and the other is connected to the proportional valve 31. The outlet port is connected to a pilot port of a corresponding control valve in the control valve 17. Therefore, the shuttle valve 32 can apply the higher one of a pilot pressure generated by the operating device 26 and a pilot pressure generated by the proportional valve 31 to a pilot port of a corresponding control valve.

The proportional valve 33 includes proportional valves 33L and 33R, and operates as a control valve for machine control the same as the proportional valve 31. The proportional valve 33 is placed in a conduit connecting the operating device 26 and the shuttle valve 32, and is configured to be able to change the flow area of the conduit. According to this embodiment, the proportional valve 33 operates in response to a control command output by the controller 30. Therefore, the controller 30 can supply hydraulic oil discharged by the operating device 26 after reducing the pressure of the hydraulic oil to a pilot port of a corresponding control valve in the control valve 17 via the shuttle valve 32, independent of the operator's operation on the operating device 26.

According to this configuration, even when a specific operating device 26 is not operated, the controller 30 can operate a hydraulic actuator corresponding to the specific operating device 26. Furthermore, even when a specific operating device 26 is operated, the controller 30 can force a hydraulic actuator corresponding to the specific operating device 26 to stop operating.

The selector valve 35 is configured to be able to switch the enabled state and the disabled state of the operating device 26. The enabled state of the operating device 26 is a state where the operator can operate the hydraulic actuators using the operating device 26. The disabled state of the operating device 26 is a state where the operator cannot operate the hydraulic actuators using the operating device 26. According to this embodiment, the selector valve 35 is a gate lock valve as a solenoid valve configured to operate in response to a command from the controller 30. Specifically, the selector valve 35 is placed in a pilot line connecting the pilot pump 15 and the operating device 26, and is configured to be able to switch the opening and closing of the pilot line in response to a command from the controller 30. For example, the operating device 26 is enabled when an undepicted gate lock lever is pulled up to open the gate lock valve, and is disabled when the gate lock lever is pushed down to close the gate lock valve.

The display device D1 includes a control part 40, the image display part 41, and a switch panel 42 serving as an input part. The control part 40 is configured to be able to control an image displayed on the image display part 41. According to this embodiment, the control part 40 is constituted of a computer including a CPU, a volatile storage, and a nonvolatile storage. In this case, the control part 40 reads programs corresponding to functional elements from the nonvolatile storage, loads the read programs into the volatile storage, and causes the CPU to execute corresponding processes. Each functional element may be constituted of hardware or may be constituted of a combination of hardware and software. Furthermore, an image displayed on the image display part 41 may be controlled by the controller 30 or the space recognition device 70.

The switch panel 42 is a panel including hardware switches. The switch panel 42 may also be a touchscreen. The display device D1 operates with electric power supplied from the rechargeable battery 80. The rechargeable battery 80 is charged with electricity generated by an alternator 11a, for example. The electric power of the rechargeable battery 80 is also supplied to the controller 30, etc. For example, a starter 11b of the engine 11 is driven with electric power from the rechargeable battery 80 to start the engine 11.

The engine control unit 74 transmits data on the condition of the engine 11, such as coolant water temperature, to the controller 30. A regulator 14a of the main pump 14 transmits data on a swash plate tilt angle to the controller 30. The discharge pressure sensor 14b transmits data on the discharge pressure of the main pump 14 to the controller 30. An oil temperature sensor 14c provided in an oil passage between the hydraulic oil tank and the main pump 14 transmits data on the temperature of hydraulic oil flowing through the oil passage to the controller 30. The controller 30 can store these data in the volatile storage VM and transmit these data to the display device D1 when needed.

The engine rotational speed adjustment dial 75 is a dial for adjusting the rotational speed of the engine 11. The engine rotational speed adjustment dial 75 transmits data on the setting of the engine rotational speed to the controller 30. The engine rotational speed adjustment dial 75 is configured to be able to select the engine rotational speed from the four levels of SP mode, H mode, A mode, and IDLE mode. The SP mode is a rotational speed mode that is selected when it is desired to prioritize workload, and uses the highest engine rotational speed. The H mode is a rotational speed mode that is selected when it is desired to satisfy both workload and fuel efficiency, and uses the second highest engine rotational speed. The A mode is a rotational speed mode that is selected when it is desired to operate the shovel 100 with low noise while prioritizing fuel efficiency, and uses the third highest engine rotational speed. The IDLE mode is a rotational speed mode that is selected when it is desired to idle the engine 11, and uses the lowest engine rotational speed. The engine 11 is controlled to be constant at an engine rotational speed corresponding to a rotational speed mode set with the engine rotational speed adjustment dial 75.

The sound output device D2 is configured to be able to alert a person involved in the work of the shovel 100, for example. The sound output device D2 may be constituted of, for example, a combination of an interior alarm and an exterior alarm. The interior alarm is a device for alerting the operator of the shovel 100 in the cabin 10, and includes at least one of, for example, a loudspeaker, a vibration generator, and a light emitter provided in the cabin 10. The interior alarm may also be the display device D1, which is an example of the notification device. The exterior alarm is a device for alerting a worker who works in an area surrounding the shovel 100, and includes at least one of, for example, a loudspeaker and a light emitter provided outside the cabin 10. The loudspeaker as the exterior alarm includes, for example, a travel alarm attached to the bottom surface of the upper swing structure 3. The exterior alarm may also be a light emitter provided on the upper swing structure 3. The exterior alarm, however, is optional. For example, when the space recognition device 70 operating as an object detector detects a predetermined object, the sound output device D2 may so notify a person involved in the work of the shovel 100. The exterior alarm may also be a portable information terminal device carried by a worker outside the cabin 10. Examples of portable information terminal devices include a smartphone, a tablet terminal, a smartwatch, and a helmet with a loudspeaker.

The notification device may be installed outside the shovel 100. The notification device may be, for example, attached to a pole, a steel tower, or the like installed in a worksite.

According to the example of FIG. 3, the controller 30 is configured to be able to receive a signal output by at least one information obtaining device E1 to execute various operations and output a control command to at least one of the proportional valve 31, the proportional valve 33, etc. Furthermore, the controller 30 is configured to be able to receive a signal output by at least one information obtaining device E1 to execute various operations and output a control command to at least one of the display device D1, the sound output device D2, etc.

The information obtaining device E1 is configured to be able to obtain information on construction. According to this embodiment, the information obtaining device E1 includes at least one of the boom angle sensor S1, the arm angle sensor S2, the bucket angle sensor S3, the machine body tilt sensor S4, the swing angular velocity sensor 25, a boom rod pressure sensor, a boom bottom pressure sensor, an arm rod pressure sensor, an arm bottom pressure sensor, a bucket rod pressure sensor, a bucket bottom pressure sensor, a boom cylinder stroke sensor, an arm cylinder stroke sensor, a bucket cylinder stroke sensor, the discharge pressure sensor 14b, the operating pressure sensor 29, the space recognition device 70, the orientation detector 71, the information input device 72, the positioning device 73, and a communications device. The information obtaining device E1 obtains, for example, as information on the shovel 100, at least one of a boom angle, an arm angle, a bucket angle, a machine body tilt angle, a swing angular velocity, a boom rod pressure, a boom bottom pressure, an arm rod pressure, an arm bottom pressure, a bucket rod pressure, a bucket bottom pressure, a boom stroke amount, an arm stroke amount, a bucket stroke amount, the discharge pressure of the main pump 14, the operating pressure of the operating device 26, information on a three-dimensional space around the shovel 100, information on the relative relationship between the orientation of the upper swing structure 3 and the orientation of the lower traveling structure 1, information input to the controller 30, information on the current position, etc. Furthermore, the information obtaining device E1 may also obtain information from another construction machine, an aircraft, etc. Examples of aircrafts include a multicopter, an airship, etc., that obtain information on a worksite. Furthermore, the information obtaining device E1 may also obtain work environment information. The work environment information is information on, for example, at least one of an earth property, weather, an altitude, etc. Furthermore, the space recognition device 70 may be used as an information obtaining device E1. Furthermore, the information obtaining device E1 may be the space recognition device 70 of a fixed point installation type that is set at a fixed point in a worksite.

Figure 9:
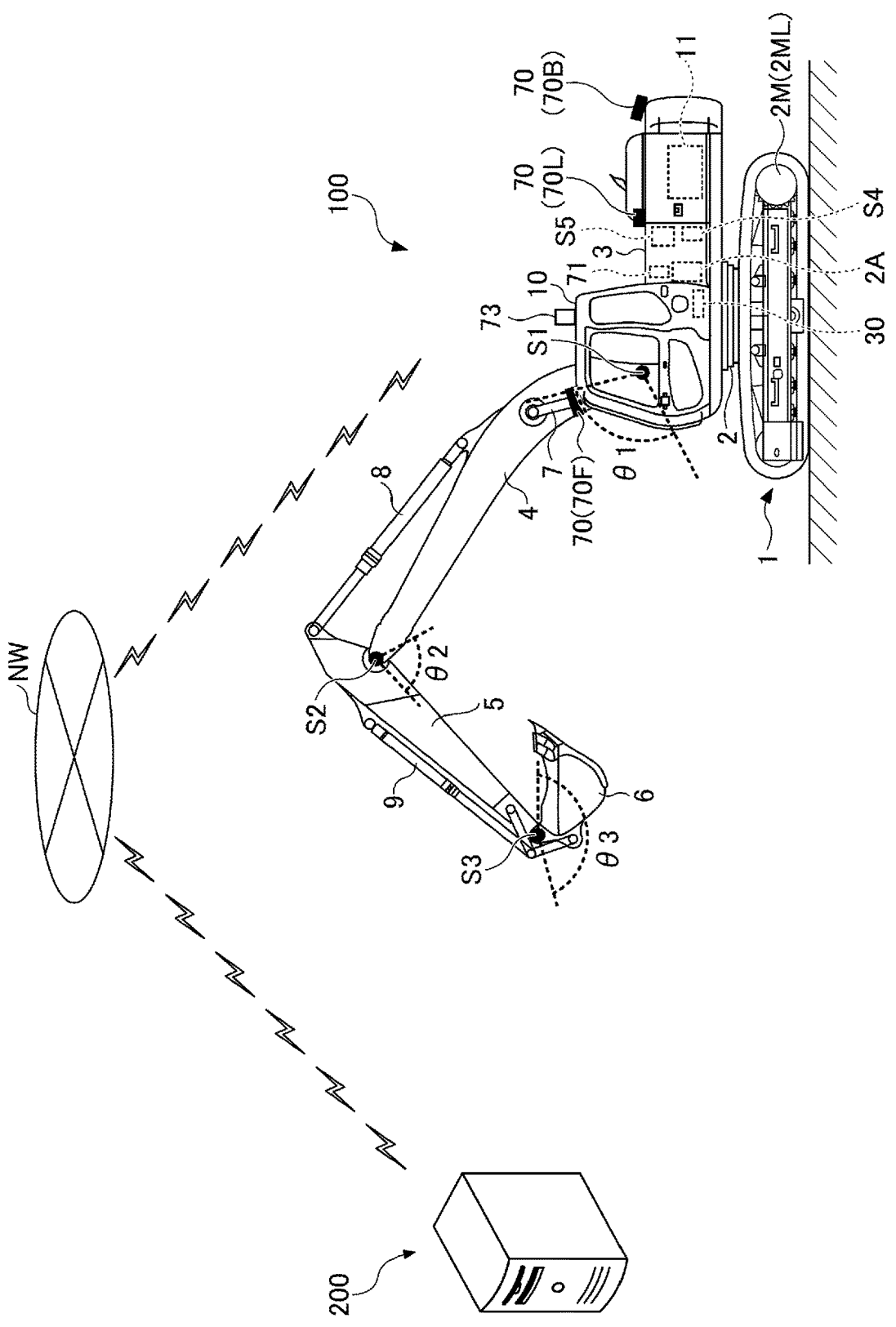
FIG. 9 is a diagram illustrating an example of a construction machine management system according to the embodiment.

The controller 30 mainly includes a danger determination part 30A as a functional element. The danger determination part 30A may be constituted of hardware or may be constituted of software. Specifically, the danger determination part 30A is configured to be able to determine whether a dangerous situation is going to occur based on information obtained (data output) by the information obtaining device E1 and information stored in a danger information database DB. That is, the danger determination part 30A determines whether a danger condition employed as a condition for determination is satisfied and further determines what danger condition is satisfied (the type of danger information). The danger determination part 30A outputs a determination result to a determination result output part (the display device D1, the sound output device D2, the exterior alarm, etc.) Furthermore, the danger determination part 30A may store the determination result in a storage together with the time and the location of the satisfaction of the danger condition. Furthermore, the danger determination part 30A may transmit the determination result to a management apparatus together with the time and the location of the satisfaction of the danger condition, and store them in the storage of the management apparatus. The danger information database DB is, for example, stored in the nonvolatile storage NM in the controller 30. FIG. 9 is a diagram illustrating an example of a construction machine management system according to the embodiment. Referring to FIG. 9, the construction machine management system includes the shovel 100 and a management apparatus 200. The management apparatus 200 can communicate with the shovel 100 via radio communications through a communications network NW. The management apparatus 200 includes a controller that is a control device for controlling the management apparatus 200. According to this embodiment, the controller of the management apparatus 200 is constituted of a computer including a CPU, a volatile storage, and a nonvolatile storage. The controller of the management apparatus 200 reads programs corresponding to functions from the nonvolatile storage, loads the read programs into the volatile storage, and causes the CPU to execute corresponding processes. As another example, the danger information database DB may be included in the management apparatus 200, for example, in the nonvolatile storage of the controller of the management apparatus 200, and configured to be able to communicate with the shovel 100 via the communications network NW. When the danger information database DB is included in the management apparatus 200, the danger information database DB is connected to multiple construction machines (for example, the shovels 100) via radio communications. The type of danger information determined to be of danger, the location of occurrence of danger information determined to be of danger, etc., are thus identified.

The danger information database DB is a collection of information systematically constructed such that information on possible dangerous situations in worksites can be searched. In the danger information database DB, for example, information on possible dangerous situations is stored in association with a work content with respect to each work content. Examples of work contents include lifting work, excavation work, loading work, crushing work, and ground leveling work.

For example, dangerous situations that may be caused by "lifting work" as a work content include "catching on teeth," "getting under a suspended load," "entering an area surrounding a suspended load," "approaching during swinging," "approaching during lifting," and "approaching during traveling." For each of these dangerous situations, the condition (determination criterion) of a dangerous situation is determined using the positional relationship and the distance relationship between various objects, the operating status of the shovel 100, etc.

Specifically, for "catching on teeth" as a dangerous situation, the condition of a dangerous situation is determined using the positional relationship between a wire rope and the bucket 6 (teeth), etc. For "getting under a suspended load" as a dangerous situation, the condition of a dangerous situation is determined using the positional relationship between a suspended load and a worker, etc. For "entering an area surrounding a suspended load" as a dangerous situation, the condition of a dangerous situation is determined using the distance relationship between a suspended load and a worker, etc. For "approaching during swinging," "approaching during lifting," and "approaching during traveling" as dangerous situations, the condition of a dangerous situation is determined using the positional relationship between a worker and the shovel 100, the operating status of the shovel 100, etc.

Furthermore, the danger information database DB may also be configured to allow the addition of information that the manager and the operator of the shovel 100, etc., input using the information input device 72. According to this, in addition to information pre-recorded in the danger information database DB, work determined to be dangerous by the manager and the operator of the shovel 100, etc., can be designated as prohibited work.

Figure 4:
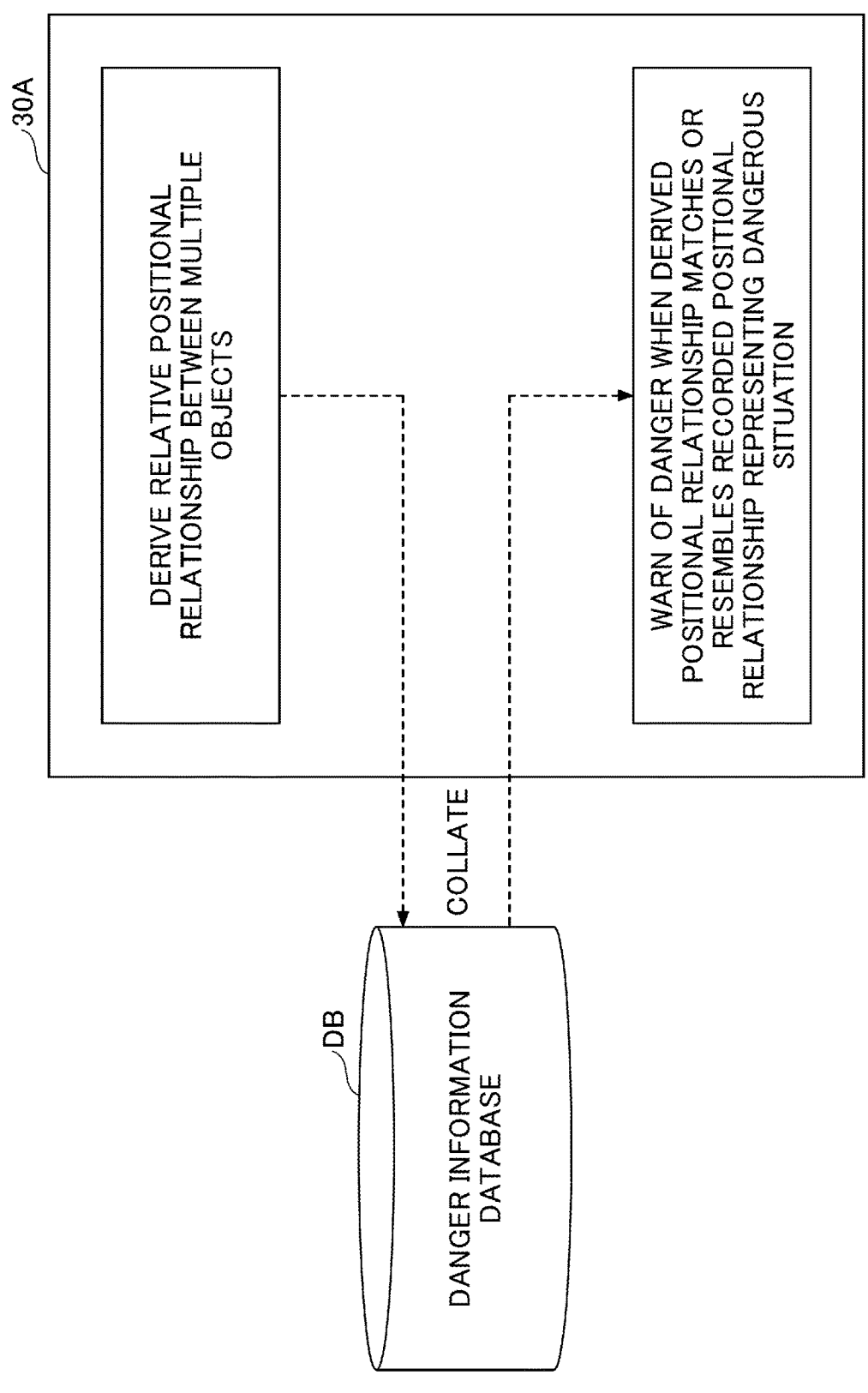
FIG. 4 is a conceptual diagram illustrating an example of the relationship between a danger determination part and a danger information database.

Specifically, the danger determination part 30A derives the relative positional relationship between multiple objects such as the bucket 6, a suspended load, and a wire rope as input information as illustrated in FIG. 4, for example. FIG. 4 is a conceptual diagram illustrating an example of the relationship between the danger determination part 30A and the danger information database DB. The danger determination part 30A collates the derived input information with reference information corresponding to the input information stored in the danger information database DB. According to this example, the reference information corresponding to the input information is, for example, reference information associated with "lifting work" among multiple pieces of reference information. In response to determining that a situation represented by the input information matches or resembles a situation represented by the reference information, the danger determination part 30A determines that a dangerous situation is going to occur.

More specifically, the danger determination part 30A derives the positional relationship between a wire rope and the bucket 6 (teeth) as input information, based on information obtained by the information obtaining device E1. The danger determination part 30A then collates the derived information with reference information representing a dangerous situation stored in the danger information database DB. Then, in response to determining that the situation represented by the input information matches or resembles the situation represented by the reference information, the danger determination part 30A determines that the dangerous situation is going to occur. The danger determination part 30A may also collate the input information with reference information representing an undangerous situation and determine that the dangerous situation is going to occur in response to determining that the situation represented by the input information does not match or resemble the situation represented by the reference information. Furthermore, the danger determination part 30A may also determine whether a dangerous situation is going to occur, using the work environment information such as information on an earth property or information on weather.

Figure 5:
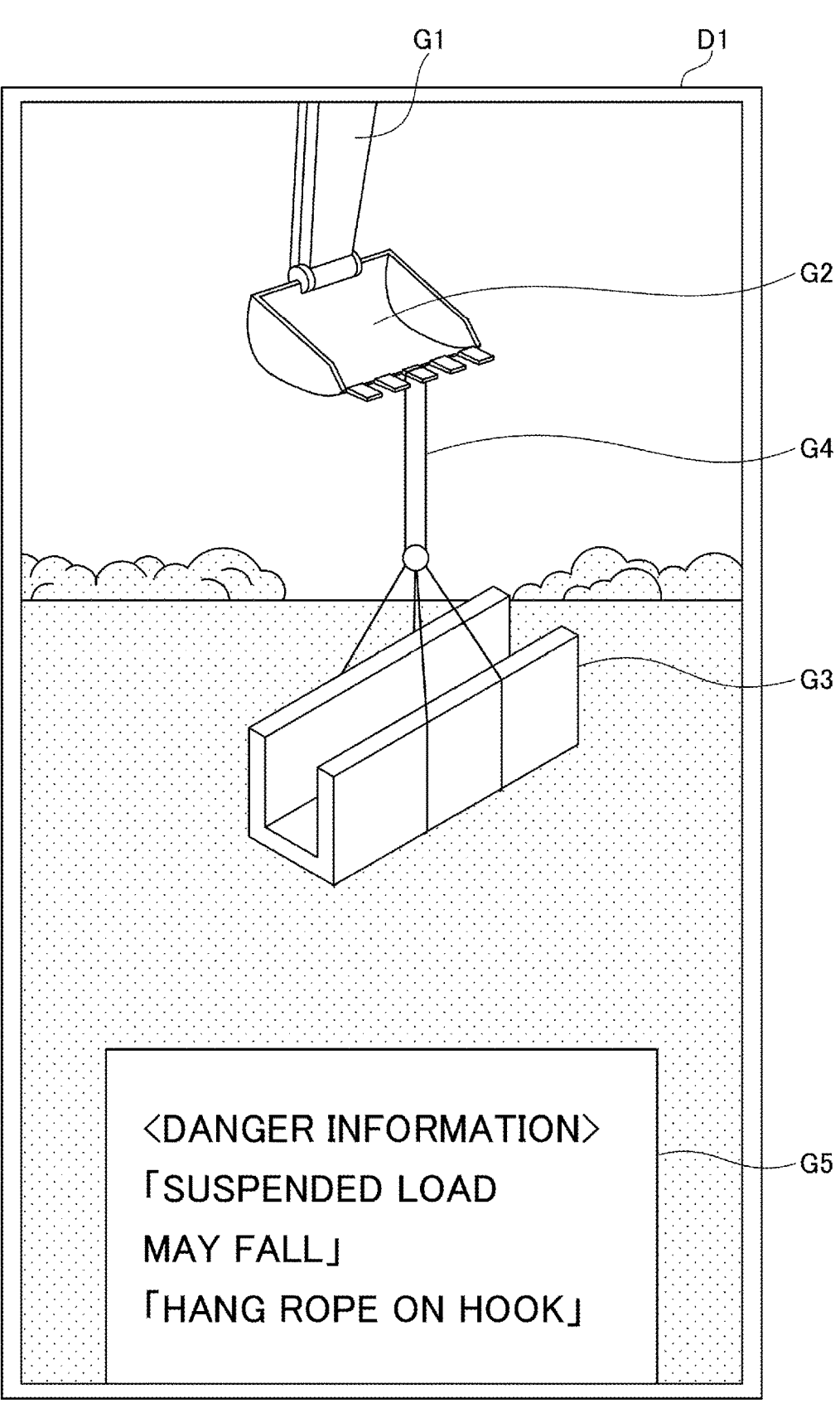
FIG. 5 is a diagram illustrating an example display of an input image.

For example, the danger determination part 30A determines that a dangerous situation is going to occur in response to recognizing the positional relationship illustrated in FIG. 5 based on an input image obtained by the front camera 70F, which is an example of the information obtaining device E1.

FIG. 5 illustrates an example of an input image obtained by the front camera 70F displayed on the display device D1. The displayed input image includes an image G1 of the arm 5, an image G2 of the bucket 6, an image G3 of a gutter block as a suspended load lifted by the shovel 100, and an image G4 of a wire rope for lifting the gutter block.

The danger determination part 30A performs image processing on the input image to recognize the presence of the gutter block lifted by the bucket 6 and derive the position of the wire rope, the position of the bucket 6 (teeth), etc. The danger determination part 30A determines that a dangerous situation is going to occur in response to determining that the positional relationship between the wire rope and the bucket 6 (teeth) matches or resembles a relationship stored in the danger information database DB.

In response to determining that a dangerous situation is going to occur, the danger determination part 30A performs braking control of an actuator. According to this embodiment, the danger determination part 30A outputs a control command to the proportional valves 31 and 33 to force a hydraulic actuator corresponding to a specific operating device 26 to stop operating. The hydraulic actuator corresponding to the specific operating device 26 may be either all hydraulic actuators or one or some hydraulic actuators predetermined on a work content basis.

Furthermore, in response to determining that a dangerous situation is going to occur, the danger determination part 30A may activate the notification device to output a notification to the effect that a dangerous situation may occur. According to this embodiment, the danger determination part 30A activates the display device D1 and the interior alarm to notify the operator of the shovel 100 to that effect. Furthermore, the danger determination part 30A may also activate the exterior alarm to notify workers working in an area surrounding the shovel 100 to that effect. Furthermore, the danger determination part 30A may also impart the details of a dangerous situation. For example, the danger determination part 30A may cause a voice message that communicates the details of a possible situation, such as SUSPENDED LOAD MAY FALL, to be output from the sound output device D2 or cause a text message that communicates the details of a possible situation to be displayed on the display device D1. Furthermore, for example, the danger determination part 30A may cause a voice message that communicates countermeasure information, such as HANG ROPE ON HOOK, to be output from the sound output device D2 or cause a text message that communicates countermeasure information to be displayed on the display device D1. According to the example illustrated in FIG. 5, the display device D1 displays an image G5 of a text message that communicates the details of a possible situation and countermeasure information.

Thus, according to the embodiment illustrated in FIG. 5, the controller 30 is configured to perform braking control of an actuator in response to determining that a dangerous situation is going to occur based on information obtained by the information obtaining device E1 and information stored in the danger information database DB, which is a database in the nonvolatile storage NM. In the case of shovels, however, an operation pattern is roughly determined according to work contents. For example, in the case of crane work, "slinging" is followed by "boom raising motion", which is successively followed by "swinging motion or traveling motion," "boom lowering motion" and "unloading." Therefore, it is preferable to determine whether a dangerous situation is going to be caused by the next motion when the next motion is started. If the occurrence of a dangerous situation is predicted, that is, if it is determined in advance that safety is not ensured, braking control such as stop control is performed without allowing the next motion. Thus, it is preferable to allow the next motion when a condition pertaining to the next motion is satisfied.

Figure 6:
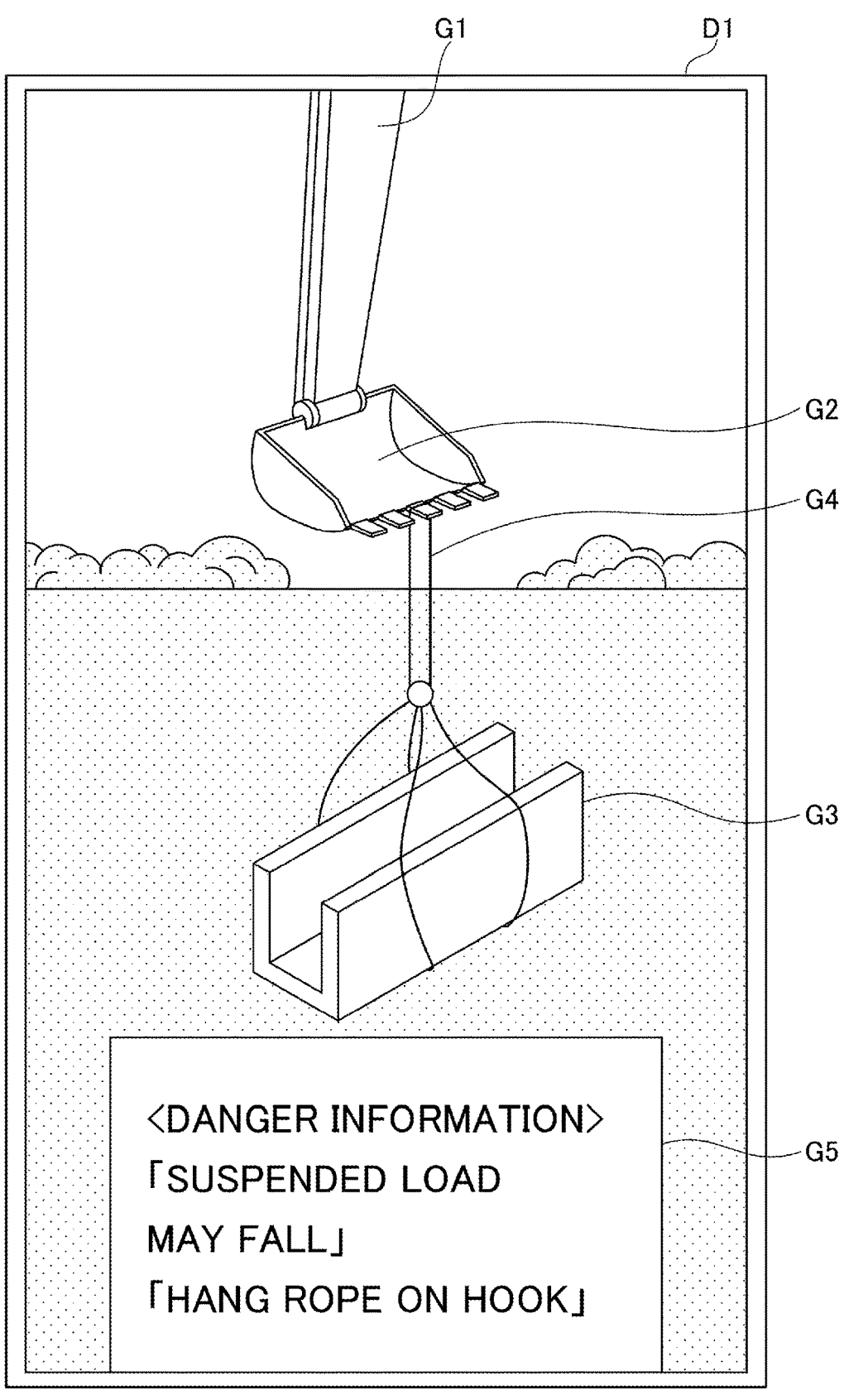
FIG. 6 is a diagram illustrating another example display of an input image.

According to the case illustrated in FIG. 6, at the time of slinging work, it is determined whether safety at the time of the next motion "boom raising motion" is ensured. The safety is determined by obtaining a situation around the shovel 100 with the information obtaining device E1. The controller 30 determines that a wire rope is hung on the bucket 6 (teeth) based on the positional relationship between the wire rope and the bucket 6 (teeth). Therefore, the controller 30 determines that the condition pertaining to the next motion "boom raising motion" is not satisfied, and does not allow "boom raising motion." Therefore, even if the operator attempts "boom raising motion" with an operating lever, the boom raising motion is not performed. Likewise, according to a shovel that executes autonomous control, a command for "boom raising motion" is not output. Thereafter, at the time of the boom raising motion, it is also determined whether safety at the time of the next motion "swinging motion" is ensured. By thus allowing the next motion by determining in advance whether the condition pertaining to the next motion is satisfied based on a situation around the shovel, it is possible to further improve safety in the surrounding area.

As described above, the shovel 100 according to an embodiment of the present invention includes the lower traveling structure 1, the upper swing structure 3 swingably mounted on the lower traveling structure 1, an actuator (the travel hydraulic motor 2M, the swing hydraulic motor 2A, the boom cylinder 7, the arm cylinder 8, and the bucket cylinder 9), the nonvolatile storage NM provided on the upper swing structure 3, the information obtaining device E1 that obtains information on construction, and the controller 30 serving as a control device. The controller 30 is configured to perform braking control of the actuator in response to determining that a dangerous situation is going to occur based on the information obtained by the information obtaining device E1 and information stored in the danger information database DB, which is a database in the nonvolatile storage NM. This configuration enables the shovel 100 to prevent the actual occurrence of a dangerous situation.

Furthermore, the controller 30 of the shovel 100 may also be configured to activate the notification device in response to determining that a dangerous situation is going to occur based on the information obtained by the information obtaining device E1 and the information stored in the danger information database DB, which is a database in the nonvolatile storage NM. This configuration enables the shovel 100 to prevent the actual occurrence of a dangerous situation.

Furthermore, the shovel 100 may cause information on the dangerous situation determined to be going to occur to be displayed on the display device D1, in order to more accurately impart the details of the dangerous situation that may occur to the operator.

Next, another example of the determination process executed by the danger determination part 30A is described. For example, instead of the above-described determination using the danger information database DB, a determination may be made using a learned model trained on danger conditions. That is, the danger determination part 30A may determine whether a dangerous situation is going to occur based on information obtained by the information obtaining device E1 and a learned model LM trained with machine learning stored in the nonvolatile storage NM.

Figure 7:
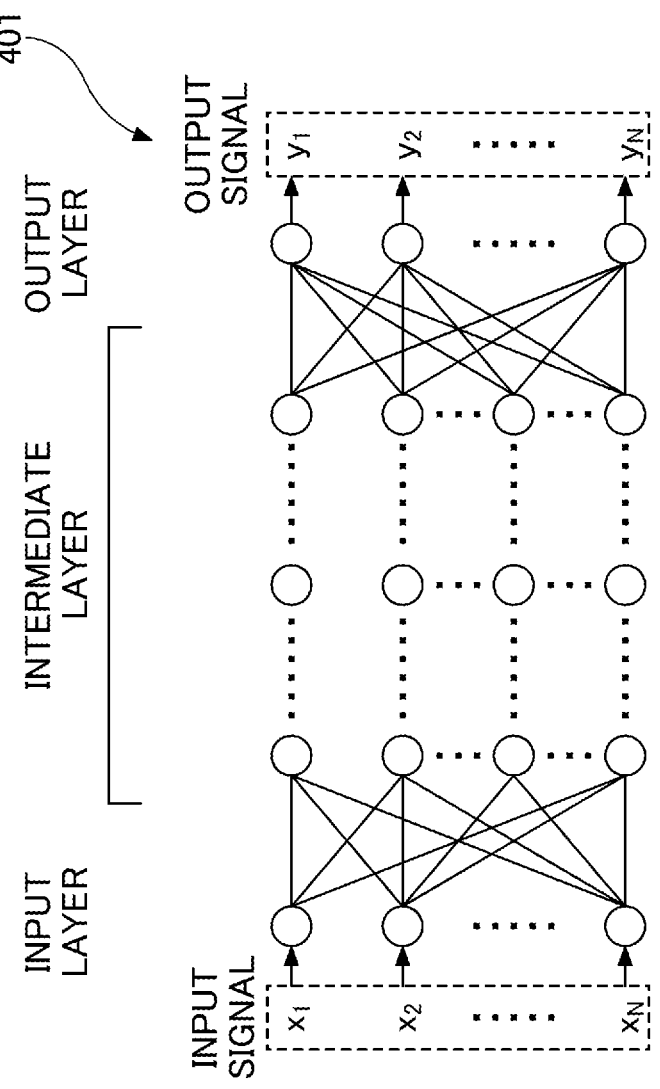
FIG. 7 is a conceptual diagram illustrating an example of a learned model.

For example, as illustrated in FIG. 7, the learned model LM is constructed mainly of a neural network 401.

According to this example, the neural network 401 is a so-called deep neural network including one or more intermediate layers (hidden layers) between an input layer and an output layer. According to the neural network 401, a weight parameter that represents the strength of connection with a lower layer is defined with respect to each of the neurons of each intermediate layer. The neural network 401 is configured such that a neuron of each layer outputs the sum of the values obtained by multiplying input values from the upper-layer neurons by their respective defined weight parameters to lower-layer neurons through a threshold function.

Machine learning, specifically, deep learning, is performed on the neural network 401 to optimize the above-described weight parameters. As a result, for example, as illustrated in FIG. 7, information (output data) obtained by the information obtaining device E1 is input to the neural network 401 as an input signal x, and the neural network 401 can output danger information as an output signal y.

As the input signal of the learned model, information (output data) obtained by the information obtaining device E1, for example, output data such as a captured image obtained by the space recognition device 70, may be used. A state quantity output from a sensor (state quantity obtaining part) of the shovel 100 (for example, information on at least one of the output value of a pose detector, an output value as the pressure of each hydraulic actuator, an output value as the pressure of the main pump 14, an output value as the swash plate tilt angle of the regulator 14a, an output value as the direction of operation and the amount of operation of the operating device 26, etc.) may be used as the input signal. The state quantity may include each output value or a feature obtained based on the output value. Features include an average, a frequency analysis, coefficient multiplication, differentiation, and integration. Furthermore, information on at least one of an earth property, weather (meteorological phenomena), altitude, etc., may be used as the input signal. Here, by using the state quantity of the shovel as the input signal, work contents and specific motions as well can be determined with the learned model. Examples of specific motions include a forward travel motion, a backward travel motion, a clockwise swing motion, a boom raising motion, a dumping motion, and an excavating motion.

The learned model learns a danger condition associated with a decrease in the safety of a worksite. The learned model learns the relationship between information on a worksite and a decrease in the safety (the type of danger information) (danger condition) according to a dataset created based on the combination of information on a worksite obtained by the information obtaining device E1, for example, a captured image obtained by the space recognition device 70 or the like, and reference information representing a dangerous situation as determination data stored in the danger information database DB.

Figure 8:
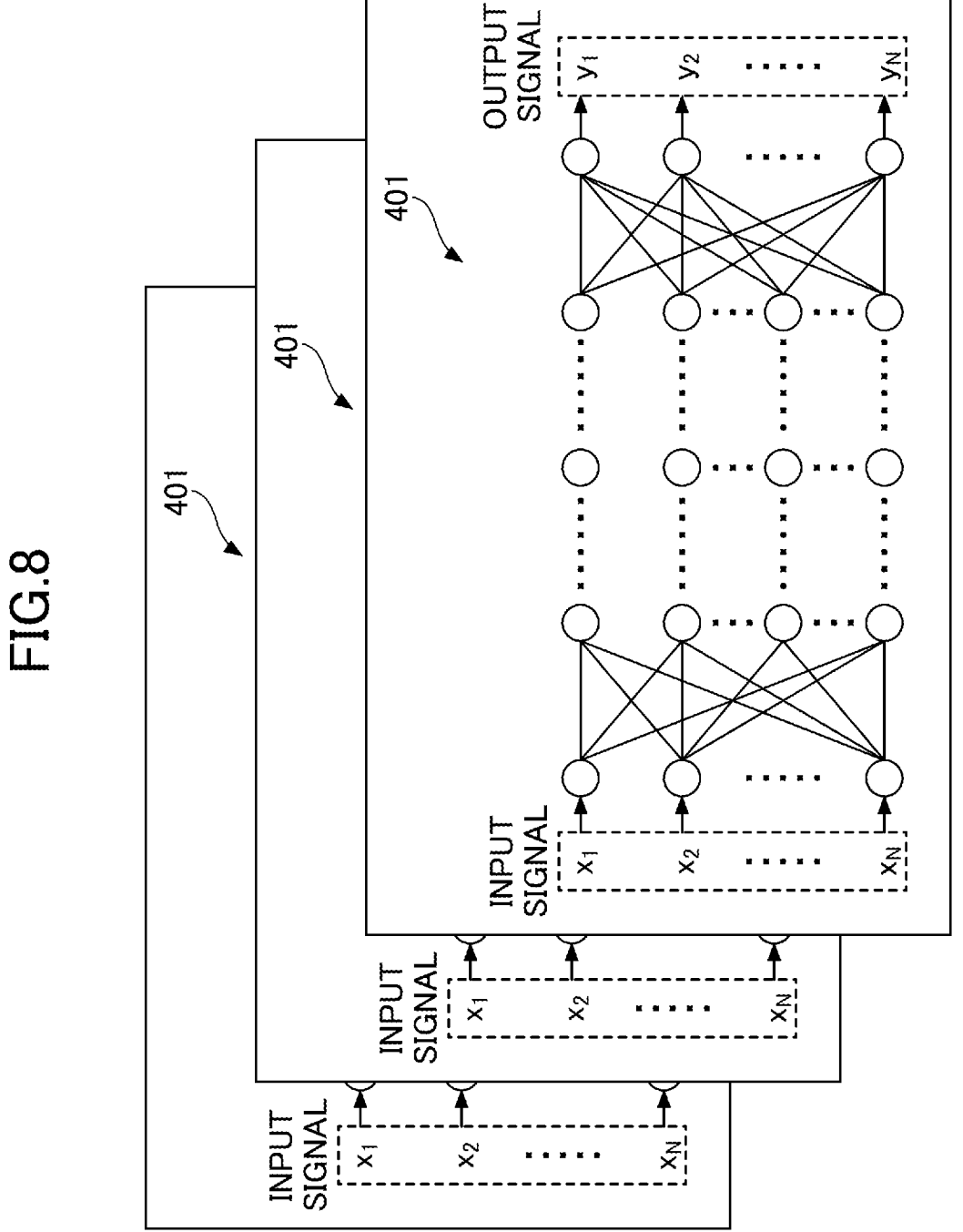
FIG. 8 is a conceptual diagram illustrating another example of the learned model.

Furthermore, for example, as illustrated in FIG. 8, the learned model that determines a danger condition and outputs danger information may be created work content by work content or specific motion by specific motion. This is because the danger information differs from work content to work content or from specific motion to specific motion. This makes it possible to, for example, create a learned model that recognizes a wire rope with higher accuracy as a learned model for "lifting work." In this case, a learned model to use is selected by determining a work content or a specific motion based on the state quantity. Thereafter, the type of danger information is determined using the selected learned model. Furthermore, each actuator may be subjected to (deceleration, stop or avoidance) control based on the determined danger information.

Furthermore, the danger determination part 30A may transmit the danger information determined by the learned model to a portable information terminal device of a worker who works outside the shovel 100. This allows the worker working outside the shovel 100 to be aware of the output result of the danger determination part 30A through notification means such as the vibrations, sound or the like of the portable information terminal device. As a result, the worker can improve a work content to a safer situation.

Figure 10:
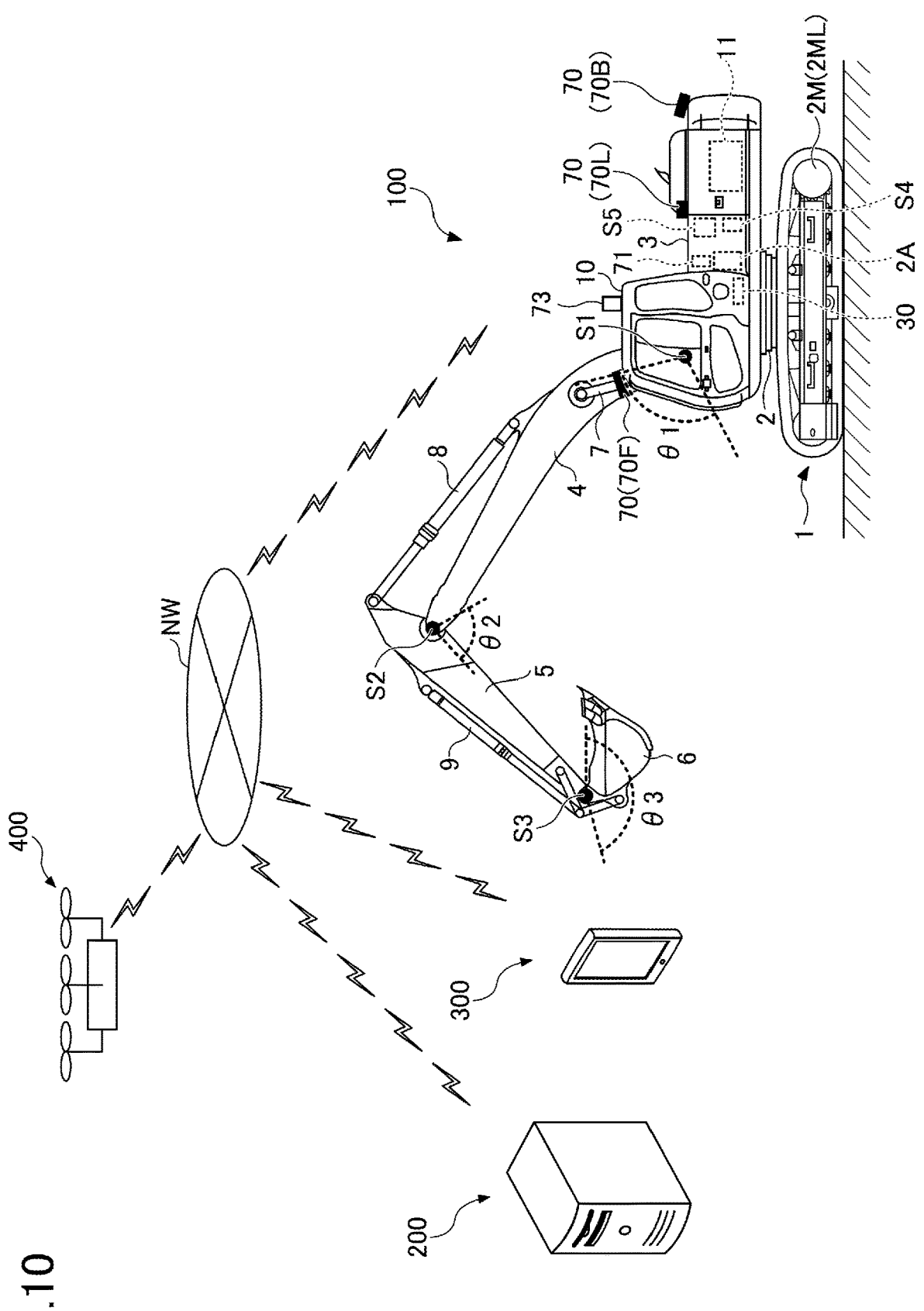
FIG. 10 is a diagram illustrating an example of a construction machine worksite management system according to the embodiment.

FIG. 10 is a diagram illustrating an example of a construction machine worksite management system according to the embodiment. According to the construction machine worksite management system of FIG. 10, the management apparatus 200 (an example of a machine learning apparatus) includes the danger information database DB and the danger determination part 30A. The danger information database DB is stored in the nonvolatile storage of the controller of the management apparatus 200. The danger determination part 30A is a function implemented by the controller of the management apparatus 200. In this case, it is possible to transmit a determination result on the basis of a captured image from the space recognition device 70 attached to a multicopter 400 for aerial photography or a steel tower, a utility pole or the like installed in the worksite from the management apparatus 200 to a portable information terminal device 300 of, for example, a worker.

An embodiment of the present invention is described in detail above. The present invention, however, is not limited to the above-described embodiment. Various variations, substitutions, etc., may be applied to the above-described embodiment without departing from the scope of the present invention. Furthermore, separately described features may be combined to the extent that no technical contradiction is caused.

According to this embodiment, while "lifting work" is illustrated as an example of a work content, the embodiment may also be applied to other work contents.

For example, the danger determination part 30A determines a boom raising motion based on the state quantity of the shovel 100, and if the presence of an electrical wire above the motion range of the shovel 100 is recognized, further determines that a danger condition is satisfied to decelerate or stop the boom raising motion.

Furthermore, for example, when the danger determination part 30A recognizes a discontinuous work plane including a large step in part of the area surrounding the shovel 100 and the shovel 100 is traveling toward the large step, the danger determination part 30A determines that a danger condition is satisfied to decelerate or stop the traveling motion. Here, the traveling motion may be determined based on the state quantity of the shovel 100 or be recognized based on a captured image.

While a hydraulic shovel is illustrated as an example of a construction machine, the embodiment may also be applied to other construction machines such as wheel loaders and bulldozers.

Various aspects of the subject matter described herein may be set out non-exhaustively in the following numbered clauses:

1. A construction machine includes
   a travel actuator;
   an attachment actuator;
   a storage;
   an information obtaining device; and
   a hardware processor configured to allow a next motion when a condition pertaining to the next motion is satisfied based on information obtained by the information obtaining device and information stored in a database in the storage.

2. The construction machine of clause 1, wherein the condition pertaining to the next motion is a condition pertaining to a situation around the construction machine.

3. The construction machine of clause 1, wherein the hardware processor is configured to determine the next motion based on a work content.

4. The construction machine of clause 1, wherein the condition pertaining to the next motion is satisfied when it is not determined that a dangerous situation is going to occur.

5. The construction machine of clause 4, wherein the hardware processor is configured to determine whether the dangerous situation is going to occur based on the information obtained by the information obtaining device and danger information associated with a selected work content in the information stored in the database in the storage.

6. The construction machine of clause 4, wherein the hardware processor is configured to activate a notification device in response to determining that the dangerous situation is going to occur.

7. The construction machine of clause 6, wherein the notification device includes a display device configured to display information on the dangerous situation determined to be going to occur.

8. The construction machine of clause 4, wherein the information obtained by the information obtaining device includes an image of an area surrounding the construction machine.

9. The construction machine of clause 4, wherein a learned model trained on a danger condition is stored in the storage, and the hardware processor is configured to determine that the dangerous situation is going to occur by inputting the information obtained by the information obtaining device to the learned model.

10. The construction machine of clause 9, wherein the learned model is created work content by work content or specific motion by specific motion.

11. A machine learning apparatus including:

a hardware processor configured to learn a danger condition of a learned model according to a dataset including a combination of information on a worksite in which a construction machine is located and determination data representing a dangerous situation in the worksite.

12. A construction machine provided with the learned model created by the machine learning apparatus of clause 11, including:

an output device configured to output danger information representing an occurrence of the dangerous situation in the worksite in response to an input of current information on the worksite, based on the learned model.

13. A construction machine worksite management system including:

a hardware processor configured to output danger information representing an occurrence of the dangerous situation in the worksite to a portable information terminal device in response to an input of current information on the worksite, based on the learned model created by the machine learning apparatus of clause 11.

What is claimed is:

1. A construction machine comprising:

a travel actuator;

an attachment actuator;

a storage including a database in which danger information is stored in association with a work content with respect to each of a plurality of work contents, the plurality of work contents being contents of work performed by the construction machine;

a sensor configured to detect multiple objects present in an area surrounding the construction machine; and a hardware processor configured to derive a relative positional relationship between the multiple objects based on information obtained by the sensor, collate the derived relative positional relationship with the danger information stored in the database, determine that a dangerous situation is going to occur in response to determining, as a result of said collating, that the derived relative positional relationship matches or resembles the danger information stored in the database, and perform braking control of at least one of the travel actuator or the attachment actuator in response to determining that the dangerous situation is going to occur.

2. The construction machine as claimed in claim 1, wherein the hardware processor is configured to collate the derived relative positional relationship with the danger information stored in the database in association with a work content selected from the plurality of work contents.

3. The construction machine as claimed in claim 1, further comprising:

a notification device that includes a display device configured to display information on the dangerous situation determined to be going to occur.

4. The construction machine as claimed in claim 1, wherein a learned model trained on a danger condition is stored in the storage, and the hardware processor is configured to determine that the dangerous situation is going to occur by inputting the information obtained by the sensor to the learned model.

5. The construction machine as claimed in claim 4, wherein the learned model is created work content by work content or specific motion by specific motion.

6. The construction machine as claimed in claim 1, wherein the hardware processor is configured to allow a next motion when a condition pertaining to the next motion is satisfied based on the derived relative positional relationship and the danger information stored in the database.

7. The construction machine as claimed in claim 1, wherein the danger information stored in the database includes positional relationships representing dangerous situations.

8. The construction machine as claimed in claim 1, further comprising:

a traveling structure; and an attachment, wherein the travel actuator is configured to drive the traveling structure, the attachment actuator is configured to drive the attachment, and the plurality of work contents are contents of work performed by the construction machine using the attachment.

9. The construction machine as claimed in claim 1, further comprising:

a traveling structure; and an attachment, wherein the travel actuator is configured to drive the traveling structure, the attachment actuator is configured to drive the attachment, and the contents of work include lifting work, excavation work, loading work, crushing work, and ground leveling work.

10. A construction machine management system comprising:

a construction machine including a travel actuator and an attachment actuator;

a sensor configured to detect multiple objects present in an area surrounding the construction machine;

a storage including a database in which danger information is stored in association with a work content with respect to each of a plurality of work contents, the plurality of work contents being contents of work performed by the construction machine; and a hardware processor configured to derive a relative positional relationship between the multiple objects based on information obtained by the sensor, collate the derived relative positional relationship with the danger information stored in the database, and determine that the dangerous situation is going to occur in response to determining, as a result of said collating, that the derived relative positional relationship matches or resembles the danger information stored in the database.

11. The construction machine management system as claimed in claim 10, wherein the danger information stored in the database includes positional relationships representing dangerous situations.

12. The construction machine management system as claimed in claim 10, wherein the hardware processor is configured to collate the derived relative positional relationship with the danger information stored in the database in association with a work content selected from the plurality of work contents.

13. The construction machine management system as claimed in claim 10, wherein the construction machine further includes a traveling structure and an attachment, the travel actuator is configured to drive the traveling structure, the attachment actuator is configured to drive the attachment, and the plurality of work contents are contents of work performed by the construction machine using the attachment.

14. The construction machine management system as claimed in claim 10, wherein the construction machine further includes a traveling structure and an attachment, the travel actuator is configured to drive the traveling structure, the attachment actuator is configured to drive the attachment, and the contents of work include lifting work, excavation work, loading work, crushing work, and ground leveling work.

\* \* \* \* \*